United States Patent

[11] 3,561,402

| [72] | Inventors | Shinichi Ishida<br>Tokyo;<br>Takatsugu Kawano, Saitama-ken; Chiaki Sato, Asaka-shi, Japan |
|------|-----------|---------------------------------------------------------------------------------------------|
| [21] | Appl. No. | 777,433 |
| [22] | Filed | Nov. 20, 1968 |
| [45] | Patented | Feb. 9, 1971 |
| [73] | Assignee | Asahi Kasei Kogyo Kabushiki Kaisha<br>Osaka, Japan<br>a corporation of Japan |
| [32] | Priority | Nov. 25, 1967, July 13, 1968 |
| [33] | | Japan |
| [31] | | 42/98663 and 43/59398 |

[54] ARTIFICIAL REFUGE REEF FOR FISH
10 Claims, 8 Drawing Figs.

[52] U.S. Cl. ................................................... 119/3
[51] Int. Cl. ........................................... A01k 61/00
[50] Field of Search ........................................... 119/1—4

[56] References Cited
UNITED STATES PATENTS

| 2,611,337 | 9/1952 | Vibert | 119/3 |
| 3,304,912 | 2/1967 | Hackman et al. | 119/5 |
| 3,314,396 | 4/1967 | Willinger | 119/5 |
| 3,324,590 | 6/1967 | Richardson | 43/131 |
| 3,347,210 | 10/1967 | Golub | 119/4 |

FOREIGN PATENTS

| 1,358,569 | 3/1964 | France | 119/4 |

*Primary Examiner*—Aldrich F. Medbery
*Attorney*—Waters, Roditi, Schwartz & Nissen ABSTRACT: An artificial reef for fish comprises a hollow tubular body with opposite open ends and constituted of a synthetic resinous substance mixed with inorganic substances so that the apparent specific gravity of the body is at least 1.1. The body is constituted by a single plate when bent to cylindrical form and connected at its ends, and a plurality of plates when of prismatic form, the plates being connected at adjacent ends by means of rings. In the case of a rectangular prism which is collapsible, internal supporting plates are used to hold the tubular body in operative state, the supporting plates being of starlike shape with apex portions engaged in cooperating openings in each of the plates.

PATENTED FEB 9 1971

ARTIFICIAL REFUGE REEF FOR FISH

The present invention relates to an artificial refuge reef for fish, and more particularly to an artificial refuge reef for fish made of a plate or plates of synthetic resinous substances.

As it is well known, the development and multiplication of fish resources are indispensable for the promotion of coastal fisheries, and as a part of the measures for such requirements, the settling of artificial reefs for fish have hitherto been executed. Although a number of artificial reefs for fish have been produced to date, they still cover only a very slight portion of the extensive coasts to be effectively utilized, and the major portion thereof is still unutilized, and it is required that a large number of artificial reefs for fish be continuously supplied therefor in the future.

Heretofore, the artificial reefs for fish were scrapped vessels and cars, trees, wooden frames, cracked stones, sandbags, iron scraps, drain pipes, etc., and in recent years, concrete blocks and iron boxes.

Among these conventional artificial reefs for fish, reefs of scrapped or used materials may seemingly be advantageous. However, the scrapped or used materials require a relatively large expense in gathering and transporting, and furthermore, these materials cannot be supplied systematically in a required large amount. On the other hand, though reefs of concrete blocks and iron boxes can be supplied as required by means of mass production systems, these reefs are very costly. From the viewpoint of the materials, reefs of wood or iron are not satisfactory because of the deterioration thereof.

Furthermore, reefs of concrete blocks require a relatively large area for the production thereof and in addition a relatively long period for the solidifying thereof after the molding, whereby the rate of operation of the production equipment is disadvantageously lowered. The structure of concrete blocks cannot be determined with much freedom and the thickness of the walls becomes unavoidably large, whereby a relatively large amount of concrete materials is consumed, while affecting adversely the efficiency of the artificial reefs for fish, since it is the inside spaces of the concrete blocks which effectively perform as the reefs for fish. Since the reefs of concrete blocks are very heavy, the cost for transportation thereof is also high.

The present invention is intended to remove the above-mentioned disadvantages in the production of conventional artificial reefs for fish and to provide an improved artificial reef for fish which is simple in structure, inexpensive in production and transportation, and effective as reefs for fish with a relatively large inner space and sufficiently long life of operation.

According to the present invention, the above-mentioned intention is accomplished by an artificial reef for fish which is made of a plate or plates of synthetic resinous substances formed in a tubular shape.

According to an aspect of the present invention, said tubular shape may be a prism defined by plates joined with each other by means of connecting rings, or according to another aspect of the present invention, said tubular shape may be a substantially circular cylinder defined by one plate, whose ends are joined with each other by means of connecting rings.

The plates may be solid or may be provided with a number of perforated openings, and furthermore, they may be made of a homogeneous synthetic resinous substance having a specific gravity of not less than 1.1 or they may be made of a synthetic resinous substance mixed with inorganic substances such as metal, glass, sand, clay, talc and silica so that the apparent specific gravity of the plates is not less than 1.1.

The plates may also be made of a synthetic resinous substance having an apparent specific gravity less than that of sea water so that the artificial reef is secured in a floating condition under the surface of the sea by any suitable anchor means.

Some preferred embodiments of the present invention will now be described with reference to the accompanying drawings.

Figure 1:
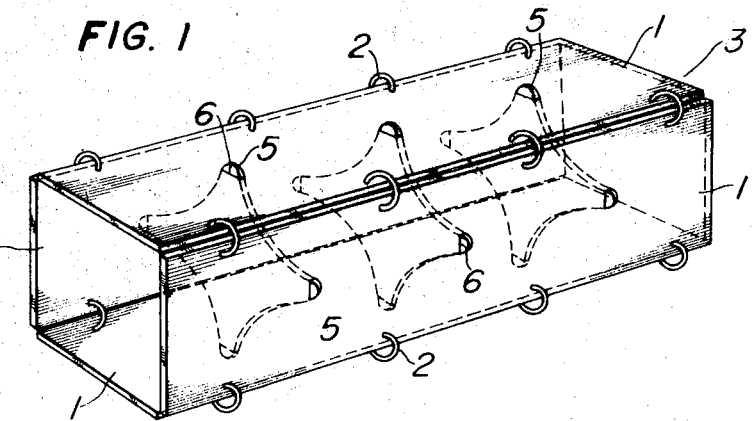
FIG. 1 is a perspective view of an artificial reef for fish in the shape of a square prism according to one embodiment of the present invention.
Figure 2:
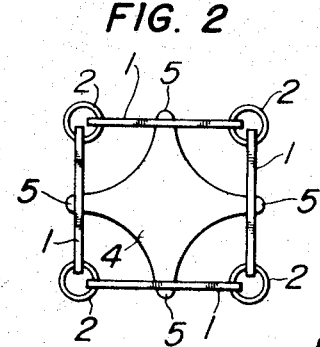
FIG. 2 is an end view of the reef shown in FIG. 1.

Referring to FIGS. 1 and 2, a refuge reef is shown composed of four substantially flat plates 1, each being joined with adjacent ones by means of connecting rings 2 so that a body in the shape of a square prism 3 is formed. The shape of the square prism is stabilized by means of three starlike interior supporting plate members 4, the apex portions 5 thereof being engaged in cooperating openings 6 provided in plates 1. The plates 1 and the starlike supporting plate members 4 may be made of a homogeneous synthetic resinous substance having a specific gravity not less than 1.1 or a synthetic resinous substance mixed with inorganic substances such as metal, glass, sand, clay, talc, silica, etc. so that the apparent specific gravity thereof becomes not less then 1.1.

In using synthetic resinous substances as artificial reefs for fish, there have been anticipated several problems such as the positional steadiness of the reefs layed on the sea bed, duration of the resinous substances in the sea water and habitableness for fish.

As the results of our experiments, it was found that the reefs of the structure of the present invention can be settled on the seabed with sufficient steadiness if the materials composing the reefs have to a specific gravity of not less than 1.1, preferably not less than 1.2 in contrast to the specific gravity of sea water of about 1.03 (normally 1.025 at the surface of the sea and 1.028 in deep portions). Therefore, the problem of positional steadiness on the seabed is solved if the resinous substances having a specific gravity of not less than 1.1 are used, or in the case of polyolefins, polystyrene or other light synthetic resins, if they are mixed with inorganic substances such as metal, glass, sand, clay, talc, silica, etc. so that the apparent specific gravity becomes not less than 1.1.

Regarding the duration of synthetic resinous substances in the sea water, we found, as the results of two years experiments performed on the seabed, no sign of deterioration, breakage or mass decrease of the substances. Judging from these results, more than 10 years of duration can be expected.

As the result of the experiments performed on the seabed, it was also found that the reefs of the present invention provide good habitableness for fish, and except when an agent for controlling growth of seaweed or moss was applied to the plates, settling of seaweeds and moss on the plates of resinous substances took place normally, whereby the artificial reefs can favorably be camouflaged as natural. However, the settling of seaweed and moss on smooth surfaces occurs generally later than they do on coarse surfaces where talc, sand, etc. are mixed.

Figure 3:
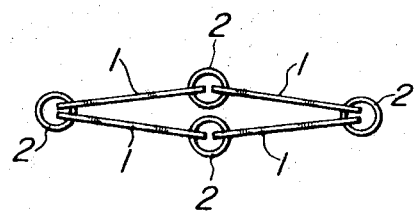
FIG. 3 is an end view of the reef shown in FIG. 1, but shown in a folded condition.

The reef shown in FIGS. 1 and 2 can be transported in a partly assembled condition or collapsed state as shown in FIG. 3, whereby the efficiency of transportation is much improved.

Figure 4:
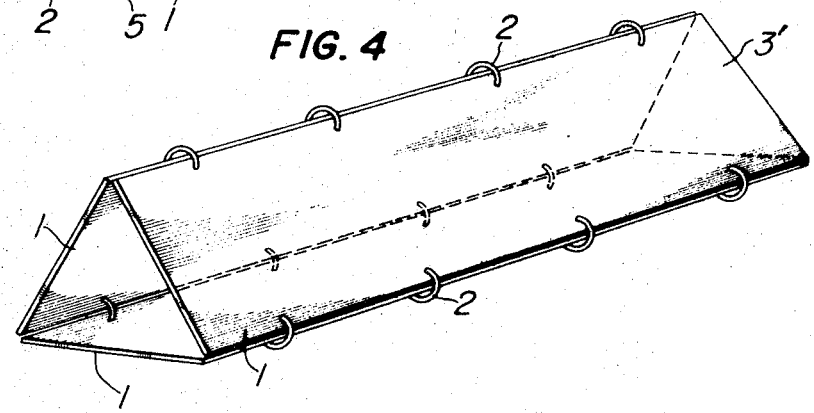
FIG. 4 is a perspective view of another embodiment of the present invention in the shape of a triangular prism.

In the embodiment shown in FIG. 4, the reef is composed of three plates 1 with the connecting rings 2 as used in the embodiment shown in FIG. 1, though in this case the three plates define a triangular prism 3'. In this embodiment, the starlike supporting plate members 4 are not necessary.

Figure 5:
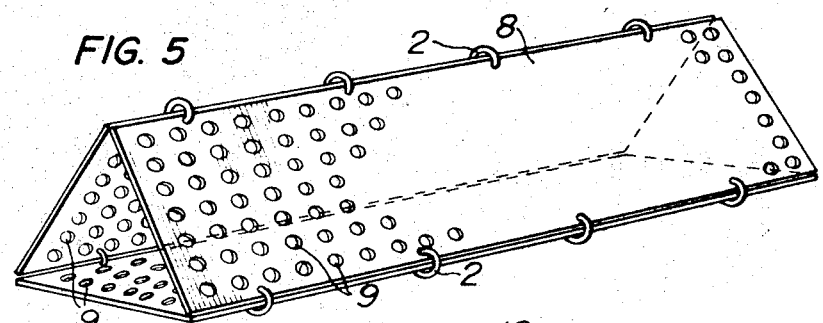
FIG. 5 is a perspective view of still another embodiment of the present invention in the shape of a triangular prism, wherein the plates are provided with a number of perforated openings.

In the embodiment shown in FIG. 5, the reef is composed of three plates 8 in the same manner as that shown in FIG. 4, but the plates 8 are provided with a number of perforated openings 9. These openings facilitate the sinking of the reef when it is settled, and furthermore, offer good entrances for fry, whereby the effect of the reef is more improved.

Figure 6:
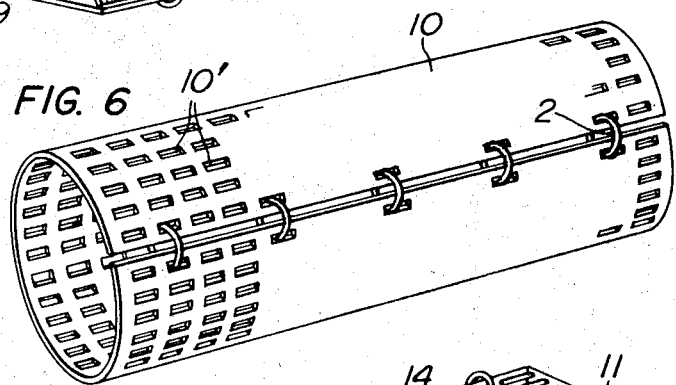
FIG. 6 is a perspective view of still another embodiment of the present invention in the shape of a circular cylinder having a number of perforated openings.

FIG. 6 shows an embodiment of the reef in the shape of a circular cylinder, wherein a plate 10 having perforated openings 10' is rolled into a circular cylinder and both ends thereof are joined with each other by means of the connecting rings 2. This structure provides the largest inner space for a determined amount of resinous substances.

Figure 7:
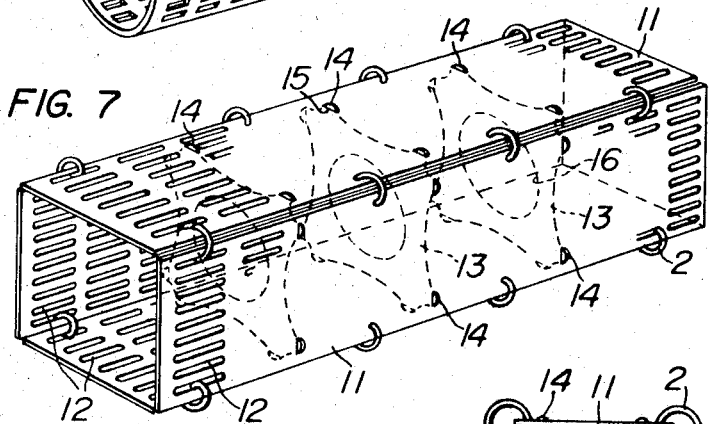
FIG. 7 is a perspective view of still another embodiment of the present invention in the shape of a square prism, wherein the plates are provided with a number of perforated openings and starlike supporting plate members are each provided with a central opening.
Figure 8:
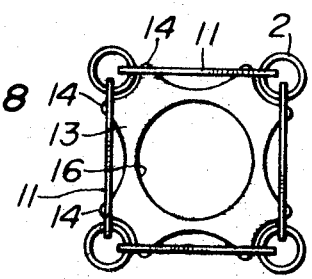
FIG. 8 is an end view of the reef shown in FIG. 7.

In the embodiment shown in FIGS. 7 and 8, which is formed by four plates 11 having perforated openings 12, each plate being joined with adjacent ones by means of the connecting rings 2, and starlike interior supporting plate members 13, said plate members each being provided with a central opening 16 extending over a substantial portion thereof. To enable the formation of the central opening 16, the apex portions of each plate member are each separated into a pair of projections 14 which are adapted to engage in cooperating openings 15 provided at end portions of the adjoining plates 11. The central opening 16 serves as an aperture means to provides a good passage for relatively large fish. In FIG. 2, the skeletonized shape supporting members 4 provides suitable aperture means between the tubular body and the periphery of members 4.

Although it has been described above that the synthetic resinous substances to be used in the present invention should have a specific gravity of not less than 1.1, it is also possible to make a reefs from synthetic resinous substances having specific gravity of less than that of the sea water so that the reefs are floatingly settled in the sea water by means of "an anchor means." With such floatingly settled reefs, an improved effect is obtained for certain species of fish.

We claim:

1. An artificial refuge reef for fish comprising a hollow tubular body with opposite ends and constituted of a homogeneous synthetic resinous substance, said body having an apparent specific gravity of at least 1.1, means in said body to permit collapse thereof, and stabilizing means for engaging said body to hold the same in an operative position in which the body is tubular, said stabilizing means comprising a plurality of interior supports spaced along the length of the tubular body, said supports and tubular body providing aperture means therethrough of a size to define fish passages through the body and past each support.

2. An artificial reef according to claim 1, wherein said body is provided with a number of perforated openings.

3. An artificial reef according to claim 1, wherein said tubular body is a prism constituted by a plurality of plates having adjoining edges, said means to permit collapse of the body comprising connecting rings joining said plates at said edges.

4. An artificial reef according to claim 3, wherein said tubular body is a rectangular prism and said supports are starlike supporting plate members having apex portions engaged in cooperating openings provided in each of said plates.

5. An artificial reef according to claim 4, wherein said aperture means is constituted as openings in the central portion of the supporting plate members.

6. An artificial reef according to claim 5, wherein each apex portion includes a pair of projections engageable in respective openings in adjacent plates.

7. An artificial reef according to claim 1, wherein said aperture means is constituted as openings in the supports.

8. An artificial reef according to claim 1 comprising an inorganic substance mixed with the resinous substance to raise the apparent specific gravity to 1.1.

9. An artificial reef according to claim 8, wherein said inorganic substance is metal, glass, sand, clay, talc or silica.

10. An artificial reef according to claim 1, wherein said supports are skeletonized and said aperture means is formed between the tubular body and said supports.